Dec. 1, 1964 T. G. SCHUT 3,159,711
DEVICE FOR THE MAGNETIC RECORDING OF TELEVISION PICTURES
Filed March 9, 1961
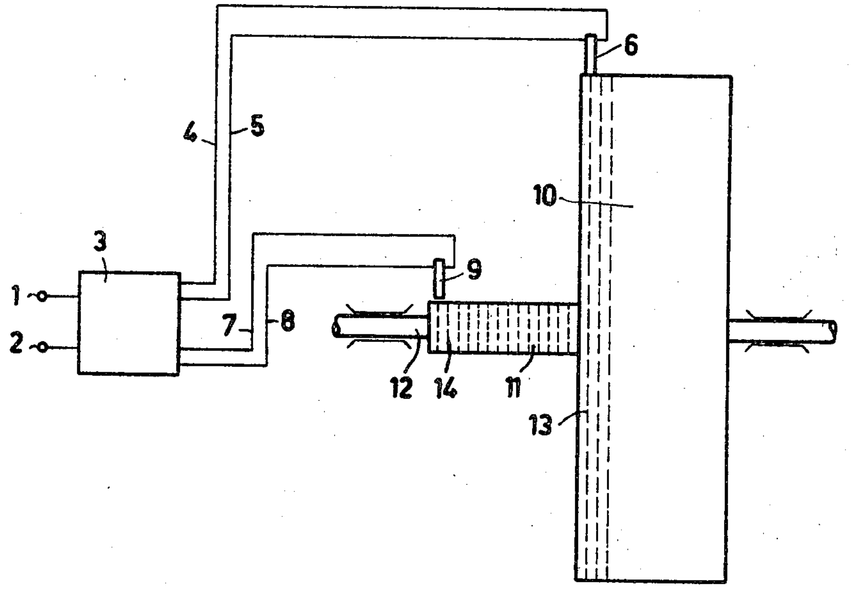
INVENTOR
THEODOOR G.SCHUT.
BY
AGENT 3,159,711

DEVICE FOR THE MAGNETIC RECORDING OF TELEVISION PICTURES

Theodoor Geert Schut, Emmasingel, Eindhoven, Netherlands, assignor to North American Philips Company, Inc., New York, N.Y., a corporation of Delaware Filed Mar. 9, 1961, Ser. No. 94,626
Claims priority, application Netherlands Apr. 12, 1960
4 Claims. (Cl. 178—6.6)

This invention relates to means for the magnetic recording and reproduction of electrical signals having a wide range of frequencies; in particular, it relates to such means which will record and reproduce with substantially equal fidelity the high and low portions of signals having a wide range of frequencies, such as encountered, for instance, when recording and reproducing television signals.

For certain purposes, for example for recording X-ray images, it is known to use a magnetic layer on the periphery of a wheel or drum, in which one or more juxtaposed magnetic tracks are recorded by means of a head and scanned afterward by means of the same or a different head.

The frequency range which must be covered for a correct recording and reproduction is very large and extends from a lowest frequency of about 50 c./s. to a highest frequency of about 7 mc./s. Recording such high frequencies requires a high peripheral speed of the wheel. If the wheel makes 50 revolutions per second, which is desirable for reasons which will be explained hereinafter, the drum requires a diameter of at least from 30 to 40 cms. in view of the high frequencies. With the normal length of the head of from 1 to 2 cms. this means a lower limit of several thousand cycles per second for the lowest frequencies, since for wave-lengths on the wheel which are large with respect to the length of the head, an excessive proportion of the magnetic flux is lost; therefore, the low frequencies located below the above-mentioned lower limit are not reproduced satisfactorily.

Efforts have been made to overcome this difficulty by modulating on a carrier wave the signals to be recorded; either the whole range of the signals is modulated or only the low frequencies thereof.

A primary object of the invention, among others, is to provide a device which will satisfactorily record and reproduce the entire range of signals in a simple and effective manner.

According to the invention, and in furtherance of the above objects, the signal to be recorded is divided into two or more frequency portions which are recorded in magnetic layers by an equal number of different heads, the magnetic layers being guided along the heads at different speeds.

According to one embodiment of the invention, the magnetic layers may be provided on wheels or drums of different diameters, which are mounted on a single shaft according to another embodiment one magnetic layer is provided on the circular periphery of a wheel or drum and the other layer or layers is or are provided on the side or sides of the relevant wheel or drum.

In order that the invention may be readily carried into effect, one preferred embodiment thereof will now be explained in detail, by way of example, with reference to the accompanying diagrammatic drawing.

The signals to be recorded, which may be television signals, are applied between input terminals 1 and 2 of a separating filter 3 of arbitrary composition. The signal is divided by the filter 3 into a high-frequency portion, which is led through leads 4 and 5 to a head 6, and a low-frequency portion, which is led through leads 7 and 8 to a head 9. The separation between the said two portions may lie at several ten-thousands of c./s. for example at 40,000 to 50,000 c./s.

The head 6 is positioned at a very small distance from the circular periphery of a wheel 10 which may be of from 30 to 40 cms. in diameter, covered with a magnetic layer, which wheel is mounted together with a wheel 11 having a diameter about one-tenth as much. The latter is positioned opposite the head 9 and is likewise covered with a magnetic layer. The two wheels are mounted on a shaft 12 which may be rotated at a speed of 50 rev./sec. by means of an electric motor (not shown). In the case of television signals, the number of revolutions is equal to the number of vertical scans of the television picture per second, so that exactly one raster can be recorded during one revolution of the shaft.

When the heads 6 and 9 are axially displaced with respect to other positions, a smaller or greater number of juxtaposed magnetic tracks may be recorded in the magnetic layers provided on the circular peripheries of the wheels. These tracks are indicated by reference numerals 13 and 14 in the figure.

Instead of being provided on wheels of different diameters, the magnetic layers may be provided on tapes which are driven at different speeds.

As a further alternative, the tracks may be recorded in a magnetic layer provided on the portion of one of the flat side walls of the wheel 10 adjacent the shaft 12. However, in this case, it is more difficult to record a number of tracks in this layer side by side.

It is to be understood, of course, that various other modifications and alternatives are possible without departing from the spirit of the invention, the scope of which is set forth in the appended claims. It is to be particularly understood that the quantitative values given above are for illustrative purposes only, to enable ready practice of the invention.

What is claimed is:

1. Apparatus for the magnetic recording of signals having frequencies ranging from low-frequency audio to high-frequency video, comprising means for separating said signals into a high-frequency portion and a low-frequency portion, a magnetic recording medium, means for moving parts of said medium at different linear speeds, means for recording said high frequency portion on a first part of said medium, and means for recording said low-frequency portion on a second part of said medium, said first part having a linear speed substantially greater than said second part.

2. Apparatus for the magnetic recording of signals having frequencies ranging from low-frequency audio to high-frequency video, comprising means for separating said signals into a high-frequency portion and a low-frequency portion, a plurality of magnetic drums having substantially different diameters, means for rotating said drums, means for recording said high-frequency portion on the periphery of a first drum having one diameter, and means for recording said low-frequency portion on the periphery of a drum having a diameter substantially less than that of said first drum.

3. Apparatus for the magnetic recording of signals having frequencies ranging from low-frequency audio to high-frequency video, comprising means for separating said signals into a high-frequency portion and a low-frequency portion, a magnetic recording drum having a periphery and a side, means for rotating said drum, means for recording said high-frequency portion on the periphery of said drum, and means for recording said low-frequency portion on the side of said drum.

4. Apparatus for the magnetic recording of television signals having frequencies ranging from low-frequency audio to high-frequency video, comprising means for separating said signals into a high-frequency portion and a low-frequency portion, the separating frequency being of the order of several thousand cycles per second, at least two magnetic drums, the first of said drums having a diameter about ten times greater than the other, means for rotating said drums at about 50 revolutions per second, means for recording said high frequency portion on the periphery of said first drum, and means for recording said low-frequency portion on the periphery of the other drum, said first part having a linear speed substantially greater than said second part.

References Cited in the file of this patent

UNITED STATES PATENTS

| | | |
|---|---|---|
| 2,005,914 | Freund | June 25, 1935 |
| 2,014,528 | Keller | Sept. 17, 1935 |
| 2,909,596 | Fay | Oct. 20, 1959 |
| 3,005,056 | Goldmark | Oct. 17, 1961 |

FOREIGN PATENTS

| | | |
|---|---|---|
| 812,468 | Great Britain | Apr. 22, 1959 |